United States Patent [19]
Villella

[11] 3,918,420
[45] Nov. 11, 1975

[54] INTERNAL COMBUSTION ENGINE

[76] Inventor: Tony R. Villella, 3106 Hewitt Ave., Everett, Wash. 98201

[22] Filed: Aug. 9, 1974

[21] Appl. No.: 496,328

Related U.S. Application Data

[63] Continuation-in-part of Ser. No. 469,033, May 10, 1974, which is a continuation-in-part of Ser. No. 432,662, Jan. 11, 1974, which is a continuation-in-part of Ser. No. 353,341, April 23, 1973, which is a continuation-in-part of Ser. No. 322,761, Jan. 11, 1973.

[52] U.S. Cl.............................. 123/75 C; 123/119 A
[51] Int. Cl.. F02m 25/06; F02b 75/02; F02d 39/02
[58] Field of Search............. 123/75 C, 119 A, 75 R

[56]             References Cited
              UNITED STATES PATENTS

| | | | |
|---|---|---|---|
| 1,206,520 | 11/1916 | Eglinton........................... | 123/75 C |
| 1,243,533 | 10/1917 | Lawson............................. | 123/75 C |
| 2,401,858 | 6/1946 | Clark ................................ | 123/75 C |
| 3,702,111 | 11/1972 | Weaving et al. .................. | 123/75 C |
| 3,703,164 | 11/1972 | Weaving ........................... | 123/75 C |
| 3,799,130 | 3/1974 | Dahlstrom......................... | 123/75 C |

*Primary Examiner*—Wendell E. Burns

[57]            ABSTRACT

A four-cycle internal combustion engine having an exhaust outlet opening in the cylinder wall provided with an exhaust edge disposed in a range between 60° and 110° of crank shaft rotation from the top dead center position of the top of said piston, an exhaust valve in the head end of the cylinder communicating with an exhaust recycling conduit and a flow valve intercommunicating with said exhaust gas recycling conduit and an intake manifold for modulating flow of recycled exhaust gases in relation to fuel being conducted to a fuel inlet valve in head of cylinder. Also an engine wherein an exhaust valve is held closed in spring loaded relation wtih said outlet opening and adjusted to provide exhaust outflow to atmosphere according to combustion pressure in the cylinder when the piston passes it. Also a second conduit communicating with gas recycling conduit with an exhaust manifold disposed to receive exhaust from said exhaust outlet opening, said second conduit conducts part of exhaust gases from exhaust valve in the head to said exhaust manifold whereby a portion of the exhaust from said exhaust valves are mixed with the hot gases from said exhaust outlet and are thereby burned in said exhaust manifold. Also a modification wherein an exhaust manifold communicates with exhaust valve in the head and exhaust from said outlet opening is mixed therewith for after burning then exhausted to atmosphere. Also method for operating a four-cycle internal combustion engine exhausting hot efficiently burned products to atmosphere via an exhaust manifold and recycling some inefficiently burned products to the intake manifold for mixture with incoming fuel for reintroduction into the combustion chambers and conducting the rest of the inefficiently burned products into said exhaust manifold for mixing with and combustion in the presence of said hot efficiently burned products of said exhaust manifold. Also specific valve and port timing relative to the movement of the piston in the cylinder for the alleviation of nitrogen oxide formation includes a relationship between the piston and an exhaust outlet opening in the side wall of the cylinder which exhaust outlet opening is positioned as indicated heretofore whereby gases under high pressure are quickly exhausted to atmosphere in a stratum which separates the hot efficiently burned gases from the most inefficiently burned gases in the quench areas of the combustion chamber and thereby quickly exhausting a substantial amount of the heat from the combustion chamber so as to minimize recycling heat in the combustion chamber and to hold the combustion chamber at a temperature sufficiently low during the combustion to prevent the formation of nitrogen oxides.

13 Claims, 21 Drawing Figures

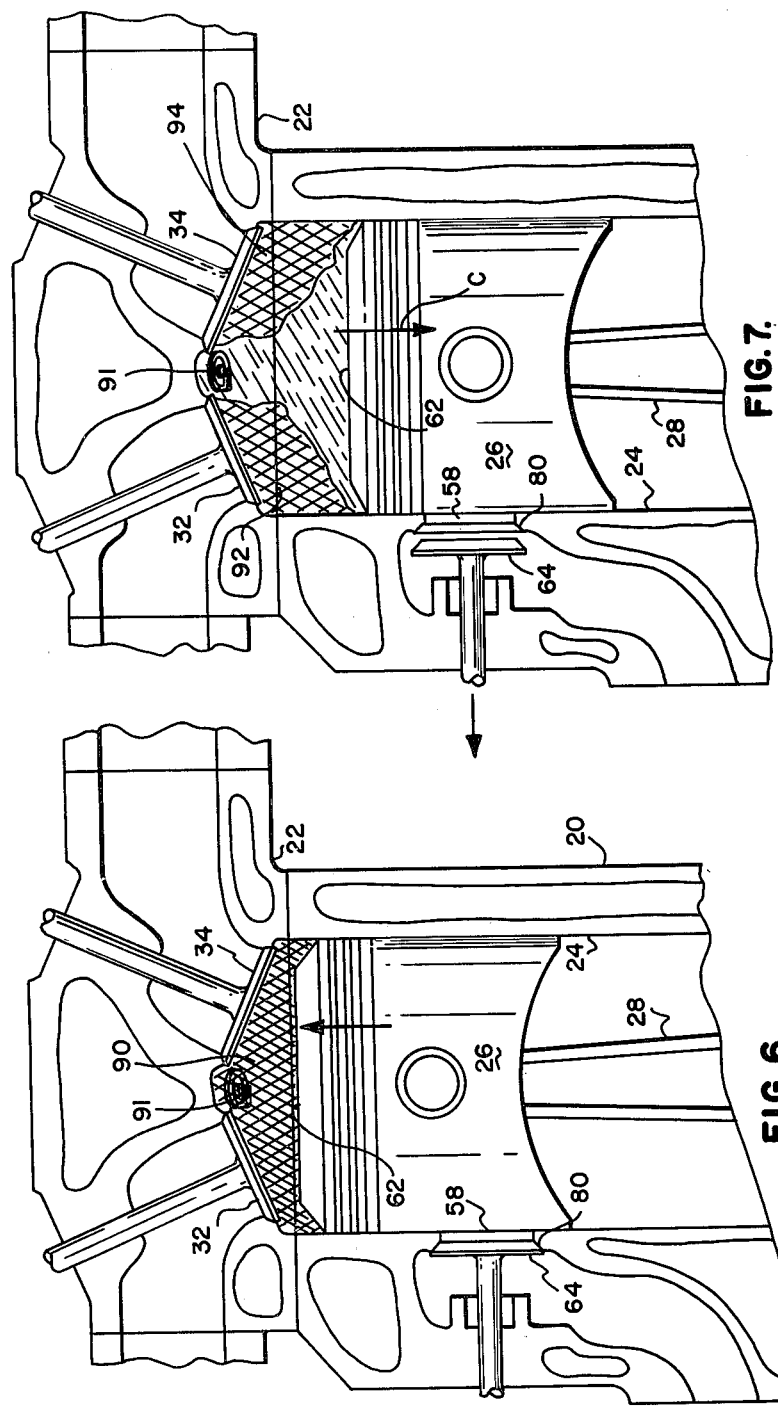

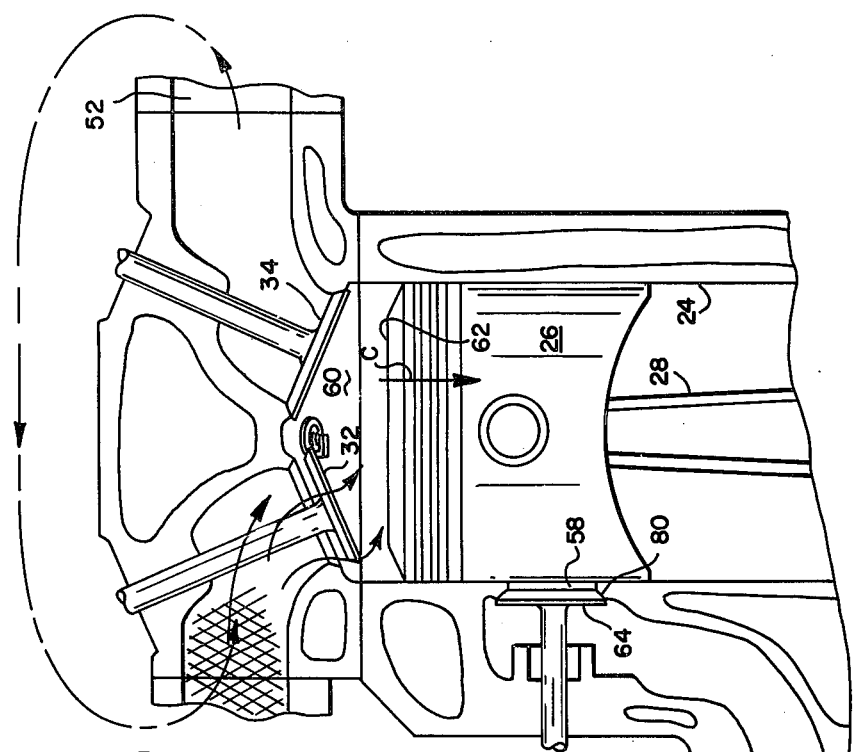
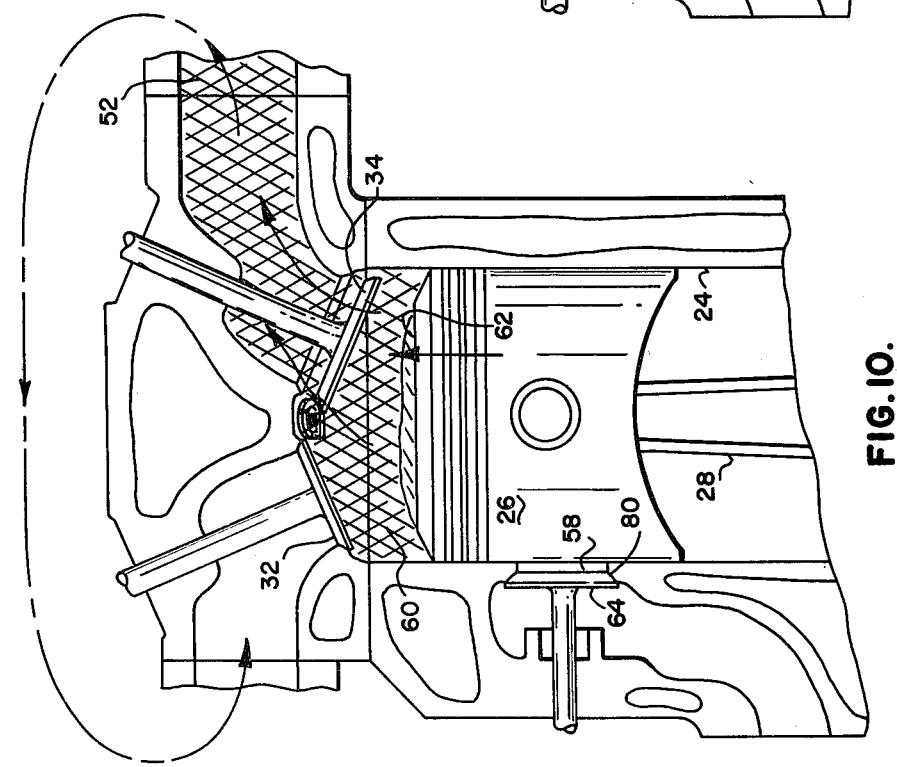
FIG. 11.
FIG. 10.

INTERNAL COMBUSTION ENGINE

This application is a continuation in part of my co-pending application Ser. No. 469,033 filed May 10, 1974 which was a continuation in part of application Ser. No. 432,662 filed Jan. 11, 1974 which was a continuation in part of application Ser. No. 353,341 filed Apr. 23, 1973 which was a continuation in part of application Ser. No. 322,761 filed Jan. 11, 1973.

PRIOR ART

The following U.S. Patents are noted:

| Wilson | Pat. No. 1,57,425 |
|---|---|
| Violet | Pat. No. 2,239,262 |
| Woerner | Pat. No. 2,701,556 |
| Gau | Pat. No. 3,57,981 |
| Pischinger | Pat. No. 3,583,375 |
| Edwards | Pat. No. 1,933,619 |
| Stivender | Pat. No. 3,470,857 |
| C. C. Groth | Pat. No. 2,123,302 |
| G. W. Lewis | Pat. No. 640,394 |
| L. J. R. Holst | Pat. No. 1,052,340 |
| John Harold Weaving | Pat. No. 3,703,164 |
| David C. Hill | Pat. No. 3,641,989 |
| S. T. Martinoli | Pat. No. 2,889,904 |
| B. Walker | Pat. No. 3,507,260 |
| Nakagina et al | Pat. No. 3,673,993 |

BACKGROUND OF THE INVENTION

Conventional four-cycle engines comprise pistons movable in cylinders, and these pistons traverse four stroke cycles in the cylinder for each ignition and power stroke therein and exhaust the intake valves operate in the head end of the respective cylinder for conventional four stroke inlet and exhaust cycles relative to the movement of the piston in the cylinder. Conventional four-cycle engines, depending upon piston and combustion chamber shape, as well as the placement of the valves and the spark plugs, all operate efficiently to a degree with relation to the combustion of fuel and especially hydrocarbons, as well as other gaseous products. It has been necessary to operate such engines with a substantially rich fuel mixture wherein an excessive amount of hydrocarbon fuel relative to oxygen, is present, so that exhaust gases from such engines usually include a substantial portion of hydrocarbons, carbon monoxide, nitrogen oxide and other unburned gaseous products. Thus, conventional four-cycle engines have been operated with a serious resultant emission contaminating effect on the atmosphere. The necessity for operating conventional four-cycle engines with a rich fuel mixture has been occasioned by a requirement that the valves in the engine do not become overheated and oxidized rapidly. It is well known that conventional four-cycle engines operating on a lean fuel mixture, where there is sufficient oxygen or an overage of oxygen for the consumption of the hydrocarbon fuels, deteriorate rapidly, due to overheating of the exhaust valves and oxidation thereof. While a lean fuel mixture and high temperatures cause exhaust valves to deteriorate rapidly, these conditions also cause nitrogen oxide to be produced at temperatures of approximately 2,750°F or thereabouts. The foregoing high temperatures of approximately 2,750°F are reached in conventional engines due to the fact that the exhaust gases are held in the combustion chambers for substantial periods of time, as for example, some four-cycle internal combustion engines retain the hot gases in the combustion chamber areas for a duration of substantially 300° to 330° of crank shaft rotation which occurs during the power stroke and then during the exhaust stroke whereby the surfaces of the combustion chambers of such engines have a substantial amount of time during which the hot gases exchange heat to the surfaces of the combustion chamber areas which heat on the surfaces of the combustion chamber areas heat the next succeeding charge of fuel substantially before combustion occurs and during combustion thereby causing high combustion temperatures due to the fact that the fuel is initially heated conductively, convectively and by radiation in the chamber before the spark plug fires the charge of fuel. The flame, heat and pressure propagation rises according to a factor related to the initial temperature of the fuel when ignited and the factor is known to be critical since a small increase in the initial temperature of the fuel before ignition will create a fairly large increase in the maximum combustion temperature, and thus continued recycling of heat in the combustion chambers of conventional engines causes these chambers to run hot and to create high ignition temperatures which result in higher combustion temperatures and these temperatures exceed those which are necessary for the production of nitrogen oxides and therefore these conventional engines do produce a substantial amount of nitrogen oxide because of the foregoing conditions. On the other hand hydrocarbons and carbon monoxides require substantial temperature for efficient burning thereof and fuel that is completely consumed produces only harmless carbon dioxide and accordingly it is well known that it is difficult to compromise between the problems related to the emission of hydrocarbons and carbon monoxide and also nitrogen oxide. Accordingly, it has been necessary to apply various accessories and equipment to the induction and exhaust systems of these engines in order to reduce the foregoing undesirable gaseous emission from the exhaust of thereof.

SUMMARY OF THE INVENTION

The present invention related to a four-cycle internal combustion engine, wherein combustion chambers and cylinders are provided with a head end and with pistons reciprocally mounted therein, and wherein intake and exhaust valves are communicating with the head end of the cylinder and wherein a stratifying exhaust port and valve are disposed in the side wall of the cylinder a substantial distance from the head end of the cylinder so that strata of exhaust gases may be exhausted from areas adjacent the top of the piston to atmosphere, as the piston passes the respective exhaust port in the side wall of the cylinder.

The aforementioned exhaust valve in the head end of the combustion chamber and the cylinder communicates through an exhaust gas recycling conduit with the intake manifold of the engine which communicates with the aforementioned inlet valve at the head end of the cylinder, and flow control valve means controls the flow of the recycled exhaust gases passing through the recycling conduit to the fuel inlet manifold of the invention so as to coordinate the amount of exhaust gas recycled in relation to the amount of fuel mixture conducted through the intake manifold and into the combustion chamber through the intake valve at the head end of the cylinder and combustion chamber.

The invention also comprises an exhaust valve in the aforementioned port in the side wall of the cylinder for the prevention of raw fuel from escaping from the cylinder during the start of the compression stroke.

The invention also relates to the stratification of exhaust gases in a combustion chamber and cylinder, wherein flame travel moves directly from the spark plug in the head end of the cylinder to the hot surface of the piston and whereby combustion is most efficient at the hot surface of the piston due to the short time interval and due to the efficient atomization of the fuel adjacent the piston, all of which causes efficient combustion at the surface of the piston, whereupon the piston, in moving toward the end of its power stroke longitudinally of the cylinder, passes an exhaust port in the side wall of the cylinder and the most efficiently burned products of combustion, at the surface of the piston, are first exhausted through said last mentioned exhaust port in the side wall of the cylinder to atmosphere, and whereupon the relatively poorly or unburned gases remain in the cylinder at the head end thereof to be recycled through an exhaust valve and back through a recyclind conduit to the fuel inlet manifold which communicates with the intake valve in the head end of the cylinder and combustion chamber of the engine. Additionally, some of the relatively poorly or unburned gases are conducted from said recycling conduit through a second conduit to an exhaust manifold which receives hot gases from said exhaust port whereby the portion of the inefficiently burned gases are mixed with hot gases in the exhaust manifold and are thereby burned by the hot gases passing from said exhaust port in the side wall of the cylinder.

The invention comprises a novel method for operating a four-cycle internal combustion engine wherein a multi-cylinder internal combustion engine is operated sequently moving a plurality of pistons in respective cylinders and a rich recycling fuel mixture is introduced into the head end of the cylinders through air intake means and this rich fuel mixture is fired at the hot surfaces of the pistons in the cylinders which causes the pistons to be driven away from the head ends of the cylinders toward the ends of the power stroke in the cylinders, then the most efficiently burned gases are exhausted to atmosphere from the surfaces of the pistons at the positions thereof toward the ends of the power strokes of the pistons leaving the most inefficiently burned products of combustion in the head ends of the cylinders, then the pistons are moved toward the head ends of said cylinders and the most inefficiently burned products of combustion are exhausted into the intake means of the engine and mixed with a fresh fuel mixture, such that said inefficiently burned products thus mixed produce a rich recycling mixture whereupon the recycling mixture is introduced into the head ends of the cylinders and fired therein. The method also comprises conducting a portion of the rich recycling mixture with the most efficiently burned hot gases during their passage to atmosphere thereby efficiently burning a portion of the rich recycling mixture without adding atmosphere thereto and thereby minimizing the inclusion of nitrogen during the operation of the method as contrasted to prior art utilizing after burners wherein additional atmosphere containing nitrogen is used to burn the inefficiently burned products of combustion exhausted into conventional engine exhaust manifolds from the head ends of the cylinders of conventional four-cycle internal combustion engines.

The internal combustion engine of the present invention comprises a novel exhaust outlet opening in the side wall of each engine cylinder in combination with conventional inlet and exhaust valve in the head ends of the cylinder or combustion chamber and the exhaust outlet opening is provided with an exhaust edge spaced from a top dead center position of the top of the piston in a range between 75° and 105° corresponding to crank shaft rotation which moves the piston whereby the piston during the power stroke passes the said edge of the outlet opening and relieves hot gases of combustion from the upper surface of the top of the piston when it reaches approximately a position between 75° to 105° in correspondence with crank shaft rotation so that the hot gases on the top of the piston are still under substantial combustion pressure and thereby tend rapidly to expand and escape through the exhaust outlet opening in the side wall in the cylinder which causes the most efficiently burned products of combustion on the top of the cylinder to depart rapidly due to its relatively high temperature and fluidity and thus causing stratification of the efficiently burned products from the most inefficiently burned products which are in the quench areas of the combustion chamber around the cylinder walls and in the head areas of the combustion chamber all of which are generally water cooled. The escape of the gases through the outlet opening causes the relief of the chamber such that a substantial percentage of the B.T.U.'s to be expelled from the combustion chamber in a very short period of time following ignition due to the fact that the charge of combustion gases only remains for a short period of time during a minor percentage of crank shaft rotation as for example in the range between 75° and 105° depending upon the design parameters of the engine. The rapid relief of the hot gases from the cylinder and the combustion chamber in this short period of time prevents heat exchange from the gases to the combustion chamber to a marked degree and also prevents the necessity of such hot gases from being compressed and forced through the exhaust valve in the head end of the cylinder thus minimizing the heating of the head end of the cylinder or the cylinder head and also saving power relative to this function and friction normally encountered during the movement of the piston upwardly in the cylinder bore when driving the exhaust gases out through the conventional exhaust valve in the head end of the cylinder. Thus the method of the invention provides for the minimization of heating of the combustion chambers of engine cylinders so as to prevent repeated cycles from causing the accumulation of heat on the surfaces of the combustion chambers and causing relatively high temperatures of the fuel before being ignited by the spark plug thus minimizing the propagation of the temperature gradient to a level at which nitrogen oxides are formed during the combustion cycle. Additionally, any heat exchange of the gases as they pass out the outlet opening in the side wall of the cylinder is an area which is remote from the combustion of gases in the head end of the cylinder thereby preventing such heat from heating the fuel preliminary to ignition. Additionally, since the load of hot gases which passes out through the side wall outlet opening is not required to be exhausted through the conventional exhaust valve in the head end of the cylinder the heating of that end of the combustion chamber is minimized and the overall effect is a continuous operation of the engine through successive cycles without heating the surface of the combustion chamber sufficiently to cause temperature propagation in the products of combustion to a level at which nitrogen oxides are formed.

Accordingly, it is an object of the invention to provide a novel four-cycle internal combustion engine with means for stratifying products of combustion in the combustion chambers and cylinders of the engine so as to exhaust the most efficiently combusted gases to the atmosphere and to recycle the relatively unburned gases for subsequent combustion in the combustion chambers of the engine.

Another object of the invention is to provide a novel means and method for exhausting gases from the outlet opening in the lower portions of the cylinders and into an exhaust manifold communicating with the exhaust valve in the upper end of the combustion chamber so that inefficiently burned products of combustion are mixed with hot exhaust gases in the exhaust manifold to thereby reduce emissions whereupon the mixture of gases may then be exhausted to atmosphere.

Another object of the invention is to provide a novel four-cycle engine in which the most efficiently combusted fuel products adjacent the surface of a hot piston are efficiently stratified in the combustion chamber and cylinder and are allowed to escape through a port in the side wall of the cylinder in spaced relation to the head end thereof when the piston reaches a position corresponding to a major portion of its power stroke in the respective cylinder.

Another object of the invention is to provide a novel internal combustion engine particularly adapted for the minimization of nitrogen oxide emissions from the exhaust of the engine which includes the use of novel structure and a novel method wherein exhaust gases are exhausted from an outlet opening in the side wall of the engine cylinder at a position spaced from the top dead center position of the top of the piston in a range between 75° and 105° corresponding to crank shaft rotation from said top dead center position of the top of the piston so as to relieve hot gases from the combustion chamber during each power stroke cycle thereby minimizing heat exchange of the gases to the combustion chamber and thereby minimizing the maximum temperature of the fuel before ignition to prevent the propagation of temperature in the products of combustion at which nitrogen oxides are formed.

Another object of the invention is to provide a novel method as hereinbefore set forth. Further objects and advantages of the invention may be apparent from the following specification, appended claims and accompanying drawings.

BRIEF DESCRIPTION OF THE DRAWINGS

FIG. 6 is another sectional view similar to FIG. 5, showing the fuel mixture compressed in the cylinder and with the piston at a point wherein ignition is accomplished by a spark plug in the head end of the cylinder combustion chamber;

FIG. 7 is a sectional view similar to FIG. 6, showing a power stroke of the piston in the cylinder resulting from ignition of the fuel mixture in the combustion chamber by the spark plug and showing the flame travel and relative stratification of products of combustion where combustion is most efficiently attained at the surface of the piston due to its relatively higher temperature than that in the surrounding combustion chamber area;

FIG. 10 is a sectional view similar to FIG. 9, showing a continued exhaust gas recycling operation through the exhaust valve in the head end of the cylinder;

FIG. 11 shows a subsequent intake stroke of the piston with the intake valve open and the recycling of the previously recycled exhaust gases mixed with fresh fuel from the intake manifold of the engine;

DESCRIPTION OF THE PREFERRED EMBODIMENTS

Figure 1:
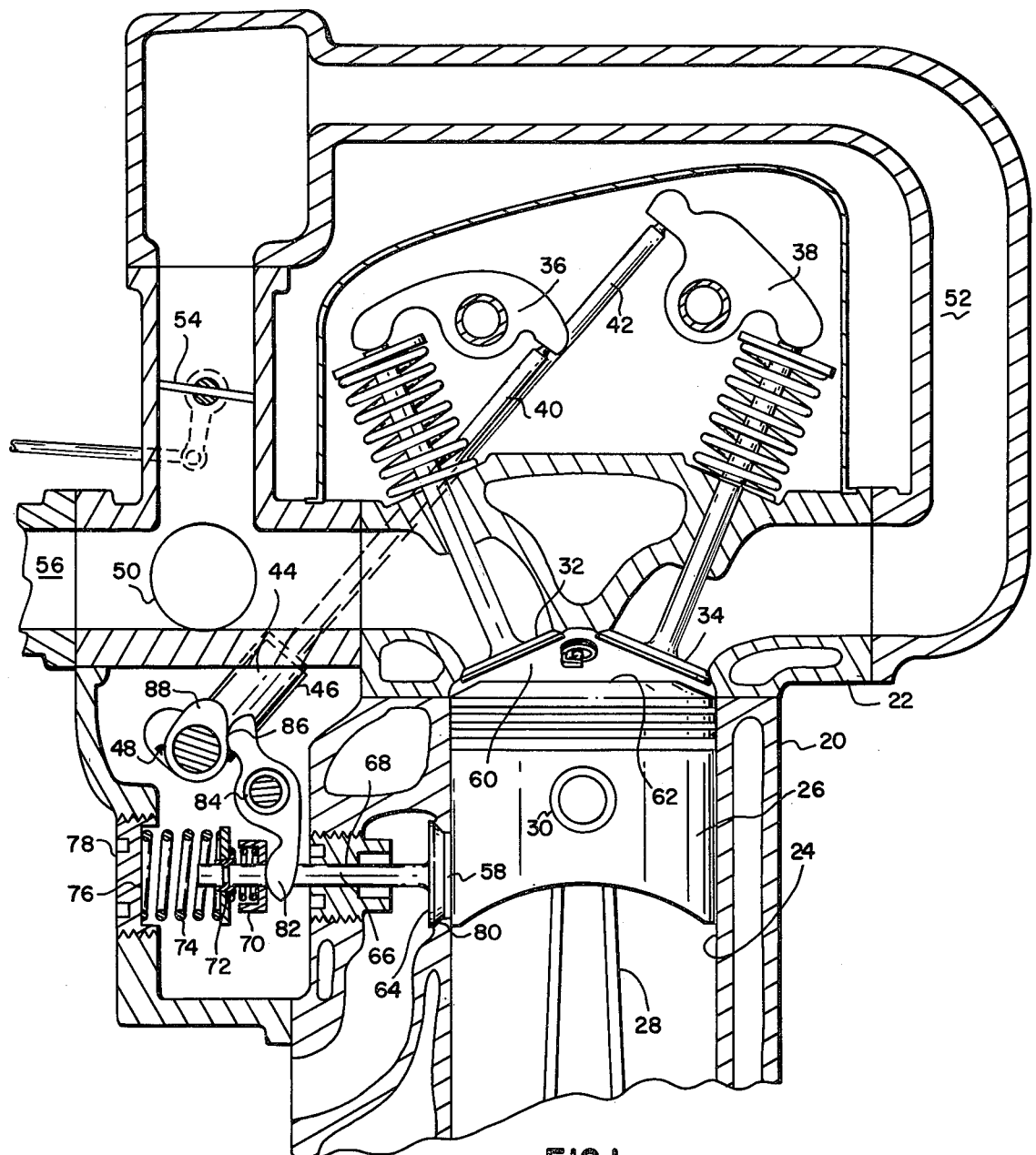
FIG. 1 is a sectional view of a four-cycle internal combustion engine in accordance with the present invention, showing parts and portions in elevation to facilitate the illustration.

As shown in FIG. 1 of the drawings, a four-cycle engine, in accordance with the invention, is provided with a water cooled block 20 having a cylinder head 22 thereon; the block 20 is a multi-cylinder engine having several cylinder bores 24 with respective pistons 26 reciprocally mounted therein and connected to conventional connecting rods 28 by suitable wrist pins 20, the connecting rods 28 being connected with a conventional crankshaft.

The cylinder bore 24 is provided with a head end substantially enclosed by the cylinder head 22 and wherein receptive intake and exhaust valves 32 and 34 are reciprocally operable in the conventional manner by means of respective rocker arms 36 and 38 actuated by respective push rods 40 and 42 which are engaged with conventional lifter mechanisms 44 and 46 respectively. These lifter mechanisms 44 and 46 are reciprocally operated by a conventional rotary cam shaft 48 adapted for timed operation of the valves in accordance with the disclosures of operation in FIGS. 2 to 11, inclusive, of the drawings as will be hereinafter described in detail.

The intake valve 32 communicates with an intake manifold 50 which communicates with a plurality of said intake valves 32 at the head end of respective cylinders 24.

Communicating with the exhaust valve 34 is an exhaust gas recycling conduit 52 which communicates with the intake manifold 50 through a flow control valve 54 which is operated in cooperative relation with the throttle of a carburetor 56 which communicates with the intake manifold 50.

Each cylinder 24 is provided with an exhaust port 58 which is spaced a considerable distance from the head end of 60 of each cylinder 24 and this exhaust port 58 communicates with atmosphere and is disposed to be bypassed by the head end 62 of each respective piston 26 as the piston cycles to its farthest position from the cylinder head 22 and the respective combustion chamber therein.

Communicating with the exhaust port 58 is a poppet valve 64 having a stem 66 reciprocally mounted in a valve guard 68. A spring loaded lifter engaging plate 70 is mounted on the stem 66 adjacent to a keeper 72 holding a compression spring 74 which is abutted at 76 to the valve case 78.

The spring 74 tends to hold the valve 64 on a seat 80 surrounding the port 58 while the lifter engaging plate 70 is adapted to be lifted to push the valve head off the seat 80 by means of bifurcated valve lifter 82 pivoted on a rocker shaft 84, the lifter 82 having a cam follower portion 86 operable by appropriate lobes 88 on the cam 48. The lobes 88 being timed relative to the stroke of the respective piston 26 to open the valve 64 appropriately in accordance with the disclosures of operation in FIGS. 2 to 11 of the drawings, as will be hereinafter described in detail.

Figure 3:
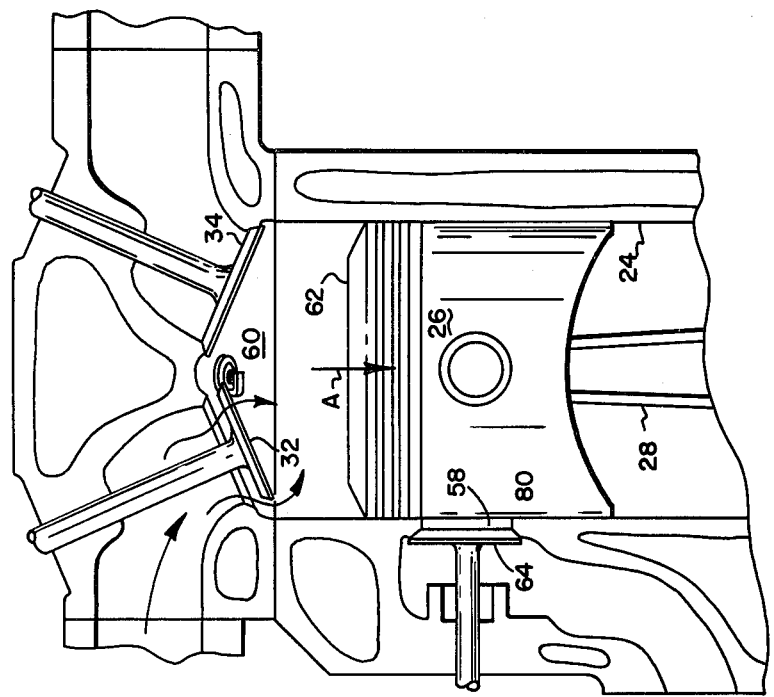
FIG. 3 is a figure similar to FIG. 2, showing a progression of the intake stroke with the piston moving away from the head end of the cylinder and with the inlet valve open admitting a fuel mixture to the combustion chamber.
Figure 2:
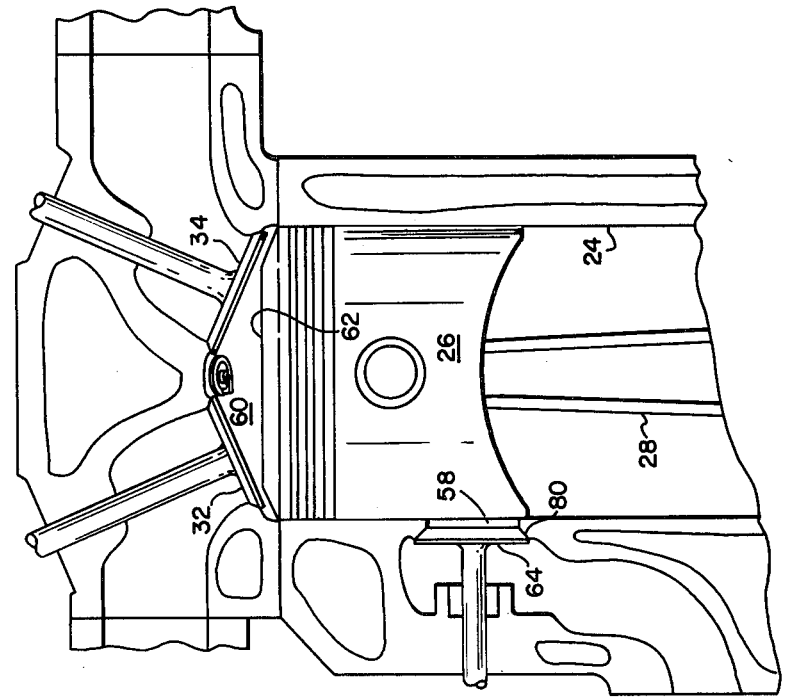
FIG. 2 is a fragmentary sectional view similar to FIG. 1 but showing the piston in top dead center position preliminary to an intake stroke thereof.

As shown in FIG. 2, the piston 26 is in top dead center position with both intake and exhaust valves 32 and 34 closed, and with the valve 64 closed against its seat 80. In this position, the piston is at its farthest stroke toward the head end of the cylinder 24 and immediately thereafter the piston moves in the direction as shown in FIG. 3 of the drawings, wherein the intake valve 32 is opened by the cam 48 so that a fuel mixture may flow around the valve 32 and into the combustion chamber at the head end 60 of the cylinder 24 as the piston moves in the direction of an arrow "A" in FIG. 3 of the drawings.

Figure 4:
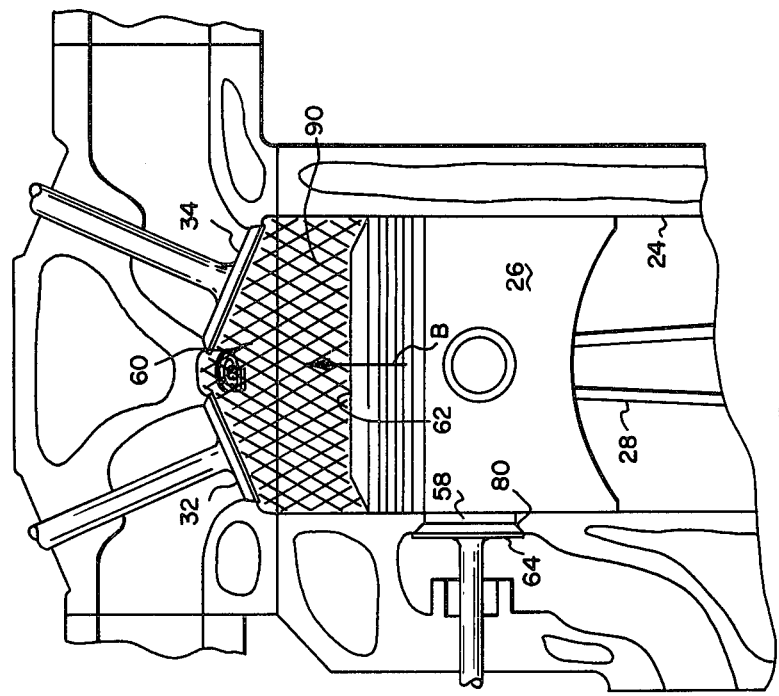
FIG. 4 is a view similar to FIG. 3, showing a completion of the intake stroke with the combustion chamber filled with a fuel mixture and with the intake valve still open but ready to close.

As shown in FIG. 4 of the drawings, the piston subsequently passes from the position shown in FIG. 3 to the furthermost position in its stroke so that the combustion chamber above the piston is filled with a fuel mixture designated 90 in FIG. 4 of the drawings. At this time the intake valve 32 closes to the position shown in FIG. 5 of the drawings, all the while the exhaust valve 64 remains on its seat 80. The piston 26, as shown in FIG. 5, then moves in the direction of an arrow "B" toward the head end 60 of the cylinder 24, compressing the fuel mixture 90 while both intake and exhaust valves 32 and 34 are in closed position.

Figure 5:
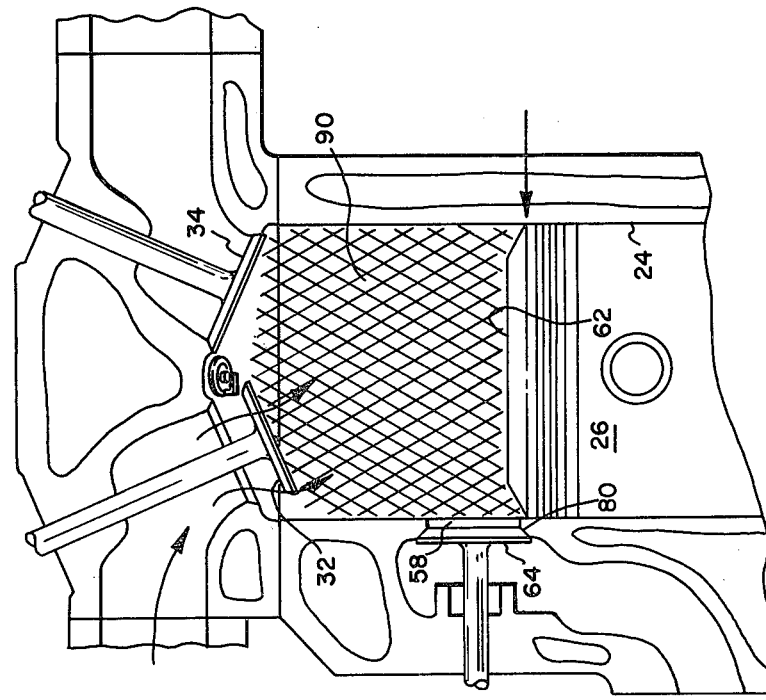
FIG. 5 is a sectional view similar to FIG. 4 but showing a successive compression stroke of the piston toward the head end of the cylinder and showing the intake and exhaust valves in the head end of the cylinder closed.

Following the stroke position shown in FIG. 5, the piston progresses to the position shown in FIG. 6, wherein the fuel mixture 90 is fully compressed and ready for ignition by a spark plug 91 in the cylinder head 22. Following the stroke position of FIG. 6, the piston as shown in FIG. 7 is forced in a direction of an arrow "C" away from the cylinder head 22 by combustion of the fuel mixture in the upper part of the cylinder 24, while both intake and exhaust valves 32 and 34 remain closed.

It will be seen that the spark plug 91, when fired, causes flame to travel directly to the upper surface or head end 62 of the piston 26, due to the fact that the piston at its surface 62 is generally at a higher temperature than other areas of the engine due to the fact that these other areas are water cooled, as for example, the cylinder head 22 and block 20 surrounding the cylinders 24 are all water cooled and heat must flow from the piston 26 to these areas; consequently, the temperature on the surface 62 of the piston forms a relatively hot combustion chamber surface which tends to provide most favorable burning conditions for the fuel mixture 90 compressed in the position as shown in FIG. 6, and subsequently substantially ignited and expanded as shown in FIG. 7.

It will be appreciated by those skilled in the art that since the surface 62 of the piston 26 is at higher temperatures than the remaining combustion chamber areas, generally speaking, the fuel mixture on the surface 62 of the piston will be burned at the highest temperature and will be most efficiently burned.

Figure 8:
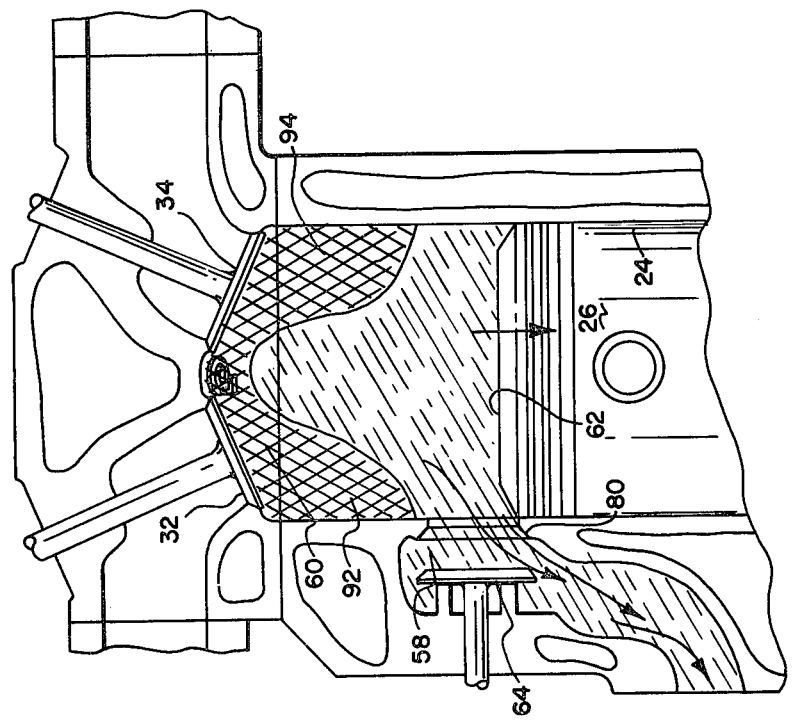
FIG. 8 is a view similar to FIG. 7, showing the most efficiently burned gases escaping through a port in the side wall of the cylinder as the piston reaches a position in its power stroke which is equal to a major portion of the stroke, and also showing a stratification between the most efficiently burned gases passing out the exhaust port in the side wall of the cylinder and the relatively unburned products of combustion in the combustion chamber end of the cylinder.

When the piston 26 is driven by combustion pressure of the fuel mixture 90 under combustion, as shown in FIG. 7, the piston moves in the direction of the arrow C and at this time the cam 48 opens the exhaust valve 64 from its seat 80 around the port 58, and as the head end 62 of the piston 26 moves to a position as shown in FIG. 8 of the drawings, this end 62 of the piston 26 passes the port 58 with the valve 64 open and allows the most completely combusted gases to escape through the port 58 to atmosphere from the head end 62 of the piston 26. It will be seen from FIGS. 7 and 8 that portions of the gases designated 92 and 94 at opposite sides of the spark plug 91 are not burned as efficiently as the gases near the hot surface 62 of the piston 26. Accordingly, these gaseous portions 92 and 94 in the head end of the cylinder, even though they expand toward the piston, do not pass outwardly through the exhaust port 58, all as shown in FIGS. 8 and 9 of the drawings.

The piston 26, shown in FIG. 8 of the drawings, is in its farthest stroke position from the head end of the cylinder 24, and the piston then progresses in the direction of the arrow B toward the head end 60 of the cylinder 24, and at this time the valve 64 is moving toward closed position with respect to the seat 80 surrounding the port 58.

Figure 9:
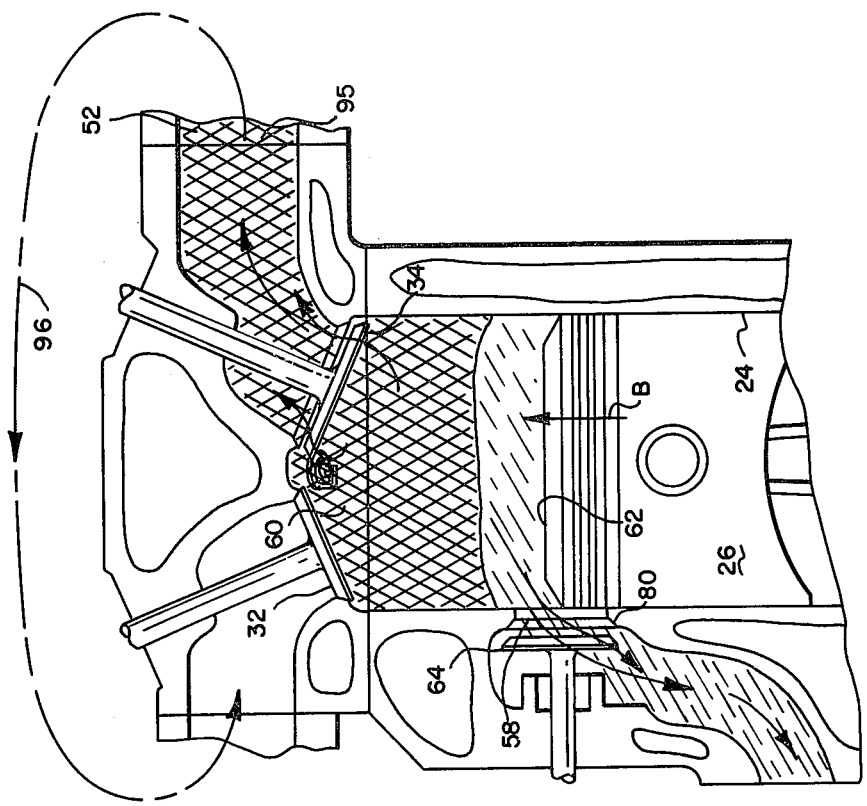
FIG. 9 is a view similar to FIG. 8, showing a successive movement of the piston toward the combustion chamber head end of the cylinder and showing an exhaust valve in the head end of the cylinder open to allow recycling of the relatively unburned products of combustion through a recycling conduit to the intake manifold of the engine.

As the piston 26 moves in the direction of the arrow B in FIG. 9 the exhaust valve 34 is opened to allow substantially unburned hydrocarbons 95, from the gaseous portions 92 and 94, to pass into the recycling conduit 52 and through the valve 54 to the intake manifold 50, all as indicated by a broken line 96 in FIG. 9 of the drawings.

Accordingly, the most efficiently burned products of combustion from the surface 62 of the piston pass outwardly through the exhaust port 58 to the atmosphere, and the relatively inefficiently combusted gases containing hydrocarbons remain in the head end 60 of the cylinder and are exhausted through the recycling conduit 52 to the intake manifold 50.

During this recycling of inefficiently combusted fuel products to the intake manifold 50, the relatively unburned hydrocarbons are mixed with fresh fuel mixtures passing through the manifold 50 and are then ready for induction into the head end 60 of other ones of the cylinders 24 through their respective intake valves 32, as shown in FIG. 11 of the drawings. At this time, the respective piston 26 is moving in the direction of the arrow C in FIG. 11 of the drawings, and fresh fuel mixed with unburned products of combustion are induced into the combustion chamber as the piston 26 moves in the cylinder 24 to create a partial vacuum therein. Subsequently, the mixture of fresh fuel and unburned hydrocarbons is combusted in a manner as hereinbefore described relative to FIGS. 6 and 7 of the drawings.

Figure 12:
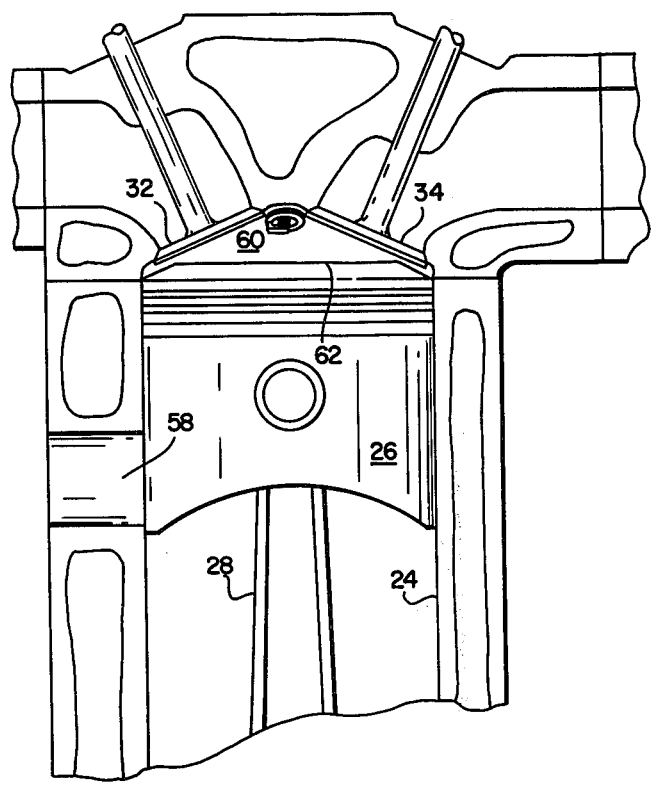
FIG. 12 is a view similar to FIG. 1 but showing a modification of the invention wherein an exhaust port in the side wall of the cylinder substantially spaced from the head end thereof is open to the atmosphere and not controlled by an exhaust valve.

In the modification as shown in FIG. 12 of the drawings, the port 58 is not provided with a valve 64, and accordingly, this combination of elements may be arranged to operate in a similar manner to that hereinbefore described when certain proportions of the engine, including bore and stroke, and the disposition of the exhaust port is such that movement of the piston toward the head end of the cylinder after the fuel intake stroke, will not cause substantial losses of the raw fuel mixture through the port 58. This intake and compression function of the structure, as shown in FIG. 12 of the drawings, will be dependent upon proportions of the engine and the relative disposition of the port 58 and the stroke of the piston 26 so as to permit efficient exhaustion of most efficiently burned gases and yet to prevent the loss of raw fuel mixture from the port 58 after the intake stroke and during the compression stroke previous to ignition of the fuel charge, generally as indicated in FIGS. 6 and 7 of the drawings.

Figure 13:
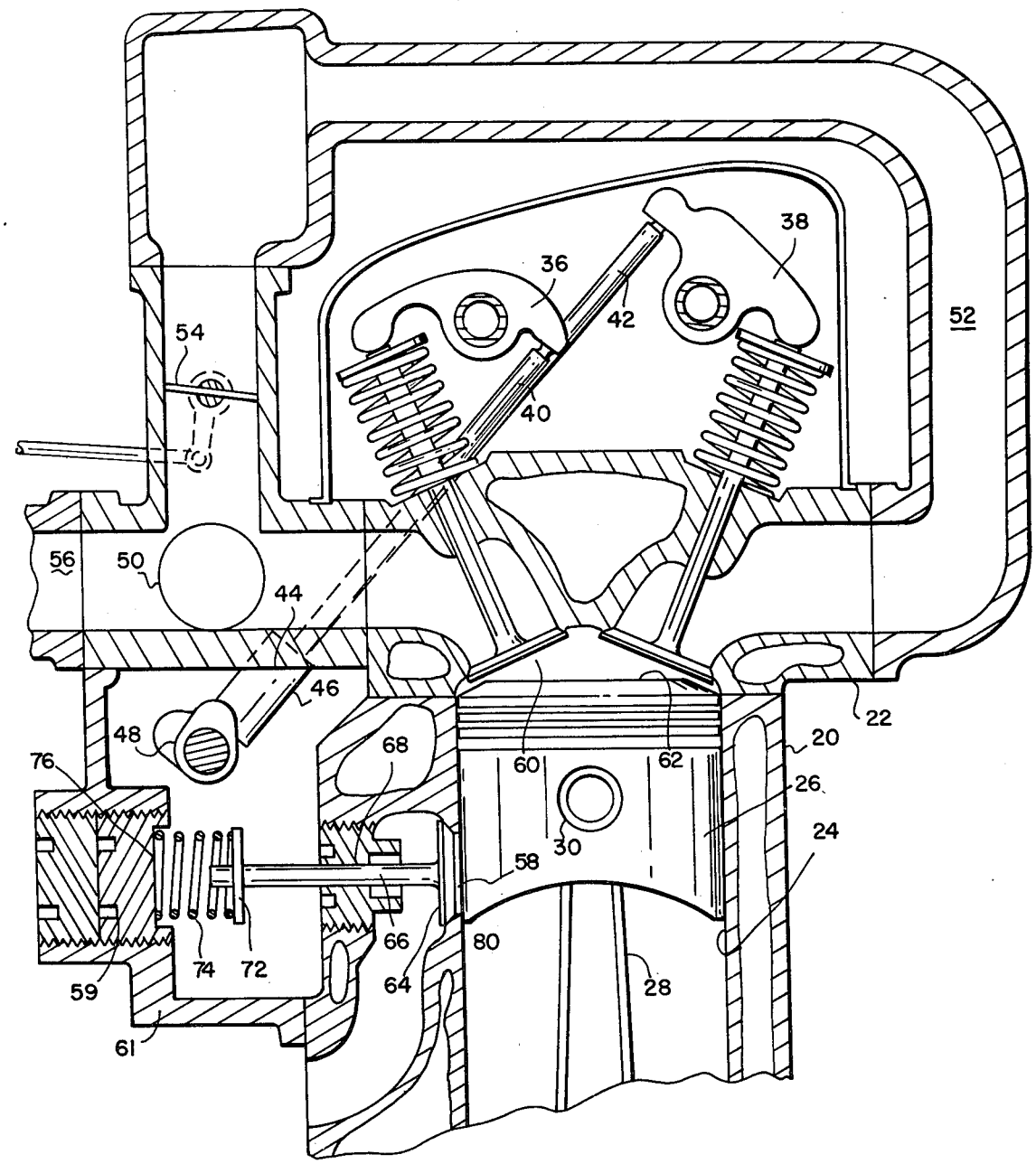
FIG. 13 is a view similar to FIG. 1 showing a modified form of the invention wherein a spring loaded exhaust valve is disposed to be opened by power stroke gas pressures at a position near the end of the piston power stroke in a respective cylinder of the engine.

As shown in FIG. 13, a modified form of the engine of the invention comprises the poppet valve 64 and spring 74 tending to hold the poppet valve 64 closed against the seat 80 and an adjustable plug 59 is screw threaded in the housing 61 so as to adjust compressive force of the spring 74 and thereby adjusting the force of the head of the valve 64 against the seat 80 so that the valve can be adjusted to respond to nominal pressure in the cylinder 24 when the piston 26 reaches a position near the end of its power stroke wherein the upper surface 62 of the piston bypasses the port 58. As hereinbefore described, the valve 64 only serves to prevent a fuel mixture from escaping through the port 58 following the intake stroke and during compression of the fuel in the cylinder preliminary to the firing stroke or power stroke. Accordingly it will be appreciated then that the pressure of the valve 60 on the seat 80 may be light and that the spring 74 may be adjusted to tune the exhaust to desired low pressure forces required for opening the valve and yet to maintain the valve closed during the initial compression stages of the fresh fuel charge in the cylinder 24 by the piston 26.

It will be appreciated that the spring loaded valve 64 as shown in FIG. 13, is not limited by any cam operation and is so adjusted that it will open readily under engine load, but when the carburetor throttle valve is closed on normal vehicle deceleration, the exhaust valve 64 remains closed and does not allow any fuel mixture or products to escape to the atmosphere through the port 58. Further, it will be appreciated that when the engine is under load and high power stroke pressures in the cylinder 24, that the valve 64 will operate rapidly without any cam limitations and thereby obviate the usual valve erosion problems attendant to the positive operation of valves by means of cams or the like.

It will be appreciated that the spring loaded valve 64, as shown in FIG. 13, when properly loaded by the spring 74, simplifies emission control normally attendant to the deceleration of an engine where the throttle of the carburetor 56 is closed and the engine is coasting down hill for example.

Additionally, it will be understood that the valve 54 provides for continuous recycling when the engine is operating under power but may be closed when the throttle of the carburetor is closed so that the inefficiently burned gaseous products will remain in the conduit 52 until the carburetor throttle is again opened for admitting a fuel mixture to the respective engine combustion chambers.

The valve 54 will be controlled in cooperation with the usual control valve of the carburetor 56 so as to provide for sufficient negative pressures at the carburetor for proper fuel mixture induction and also to provide for the recycling of an appropriate amount of the inefficiently burned products through the conduit 52 back to the engine intake manifold 50 for recycling and reintroduction of the recycling through the valve 32 and into the appropriate combustion chamber 60.

Figure 14:
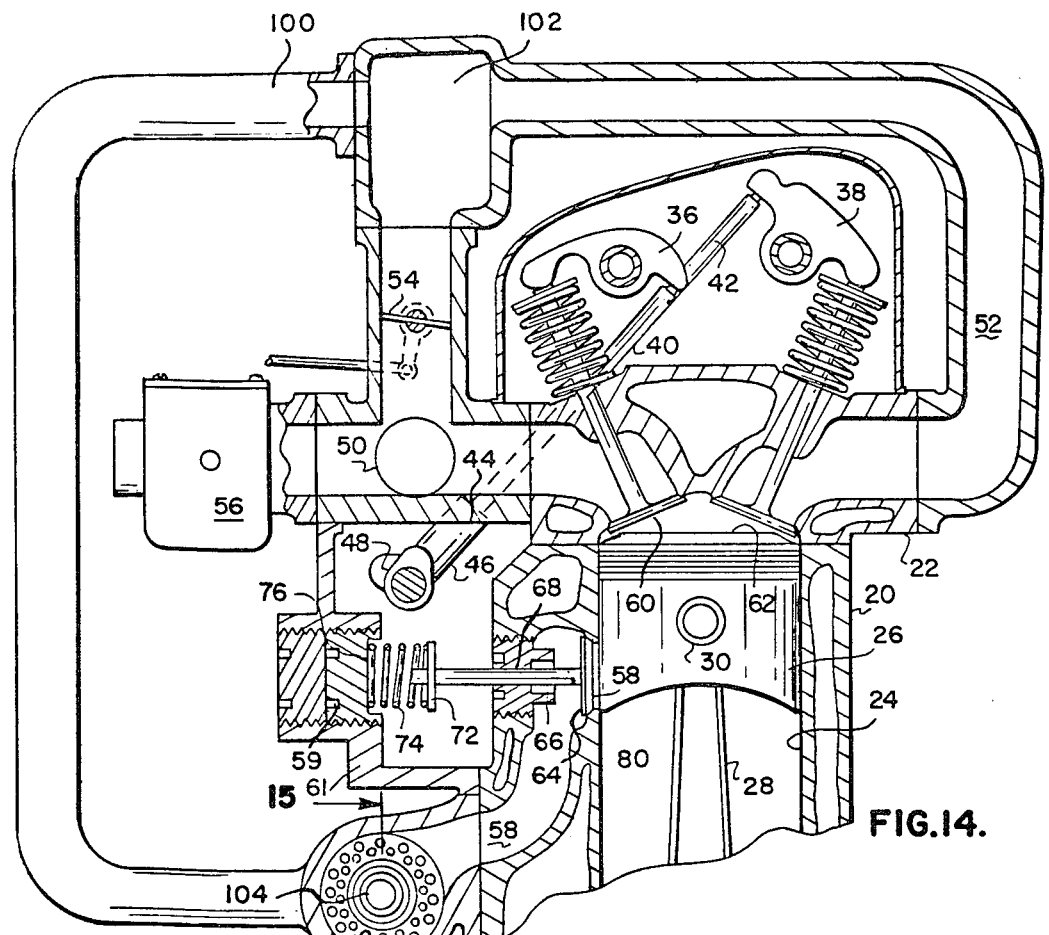
FIG. 14 is a fragmentary sectional view similar to FIG. 13 but showing an additional means for combustion inefficiently burned products of combustion exhausted from the head end of an internal combustion engine cylinder.
Figure 15:
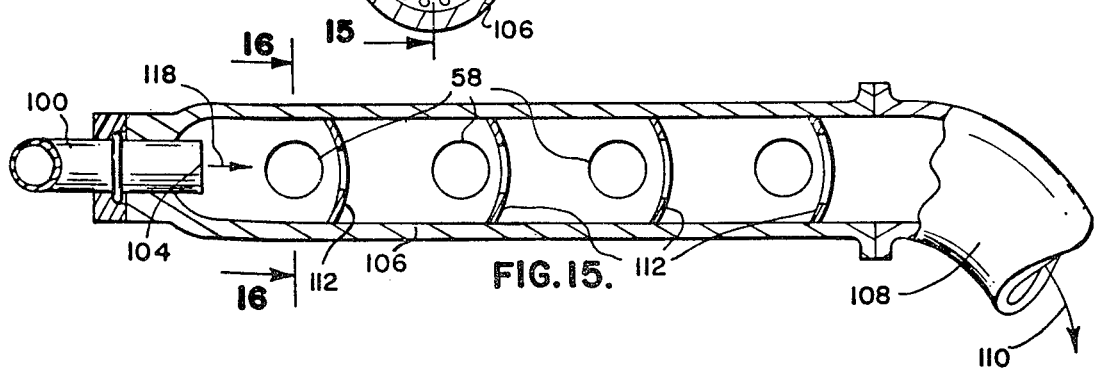
FIG. 15 is a fragmentary sectional view taken from the line 15—15 of FIG. 14.
Figure 16:
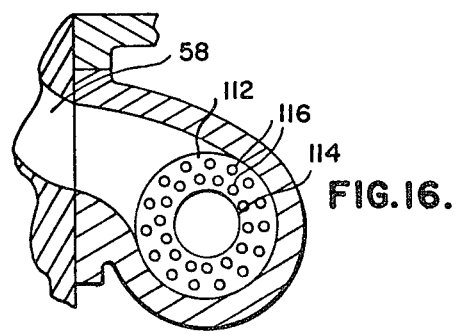
FIG. 16 is a sectional view taken from the line 16—16 of FIG. 15.

As shown in FIGS. 14, 15 and 16, an additional exhaust gas burning means is incorporated in the structure shown in FIG. 13. The disclosure of FIG. 13 is hereby incorporated in FIG. 14 and the structure in FIG. 14 additionally comprises a second exhaust conduit 100 which communicates through a chamber 102 with the exhaust gas recycling conduit 52. This second exhaust gas conduit 100, as shown in FIGS. 14 and 15, is provided with an outlet end 104 communicating with the interior of an exhaust gas manifold 106 which receives exhaust gases from the ports 58 and coupled to the exhaust manifold 106 is a tail pipe 108 which communicates with atmosphere as indicated by the arrow 110.

The exhaust gas manifold 106 is provided with combuster baffles 112, each of which is disposed downstream relative to a respective port 58.

As shown in FIG. 15 and 16, each combuster baffle 112 is disc shaped and provided with a central opening 114 through which exhaust gases may pass. Additionally, openings 116 in each baffle 112 provide for mixing of gases namely the inefficiently burned gases issuing from the end 104 of the exhaust conduit 100 and the hot efficiently burned gases passing from the ports 58.

The inefficiently burned gases passing as indicated by arrows 118, are induced at right angles to the gases passing from ports 58 and cause turbulent mixing whereupon the gases mix and pass through the openings 114 and 116 of the combuster baffles 112 and the successive functions of mixing cause very efficient mixing of the inefficiently burned gases 118 with the hot efficiently burned gases 58 thereby causing efficient reburning or after burning of the inefficiently burned exhaust gases 118 passing from the end 104 of the exhaust gas conduit 100. Accordingly, it is not necessary to add atmospheric air to burn the inefficiently burned gases 118 whereby introduction of additional nitrogen is avoided, and whereby the unburned hydrocarbons are efficiently combusted out of the inefficiently burned exhaust gases 118 by means of the high temperature exhaust gases which are exhausted from the ports 58. Accordingly, the structure of the invention as shown in FIGS. 14, 15 and 16 accomplishes efficient after burning of the exhaust gases without introducing additional atmospheric air laden with nitrogen.

With reference to FIG. 14 of the drawings, it will be seen that the valve 54 controls the amount of the rich recycling mixture passing from the conduit 58 into the intake manifold downstream of the carburetor 56. The valve 54 may be adjusted for various operating conditions to divide the flow of the inefficiently burned products of combustion to the intake manifold 50 and the second exhaust conduit 100, and accordingly, the inefficiently burned products of combustion which are not recycled to the intake manifold, are efficiently burned in the exhaust manifold 106, all as hereinbefore described.

The method of the invention comprises a method for operating a multi-cylinder four-cycle internal combustion engine wherein the engine is provided with a plurality of cylinders having sequentially movable pistons which are moved in the usual sequence relative to each other for intake, compression, power and exhaust strokes. The method comprises the introduction of a rich recycling fuel mixture into the head end of the respective engine cylinders through an intake means and firing of the rich recycling fuel mixture at the hot surfaces of the pistons in the cylinders and driving the pistons away from the head ends of the cylinders to positions near the ends of the power strokes in the cylinders, then exhausting to atmosphere through an exhaust manifold, the most efficiently burned products of combustion from the surfaces of the piston at said positions near the ends of the power stroke of the pistons while leaving the most inefficiently burned products of combustion in the head ends of the cylinders, then moving the pistons toward said head ends of said cylinders and exhausting some of the most inefficiently burned products of combustion from the cylinders into said intake means of said engine and mixing a fresh fuel mixture with said inefficiently burned products therein to produce said rich recycling mixture; the introducing said rich recycling fuel mixture into the head ends of said cylinders and firing said rich recycling fuel mixture therein; and also conducting the rest of the inefficiently burned products of combustion into said exhaust manifold and thus burning the rest of said inefficiently burned products of combustion by heat of the efficiently burned products of combustion in said exhaust manifold whereby the inefficiently burned products of combustion are after burned in the exhaust manifold 106 without the necessity of adding additional atmospheric air and the attendant problems relating to the nitrogen content thereof.

Figure 17:
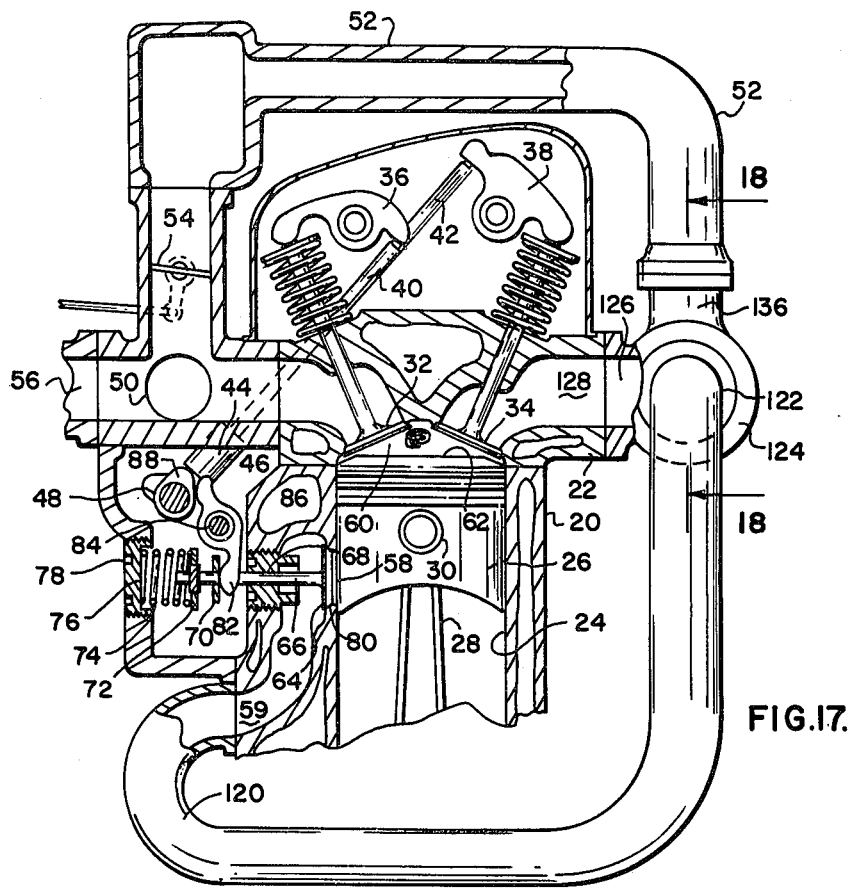
FIG. 17 is a sectional view similar to FIG. 14 but showing a modification of the invention.
Figure 18:
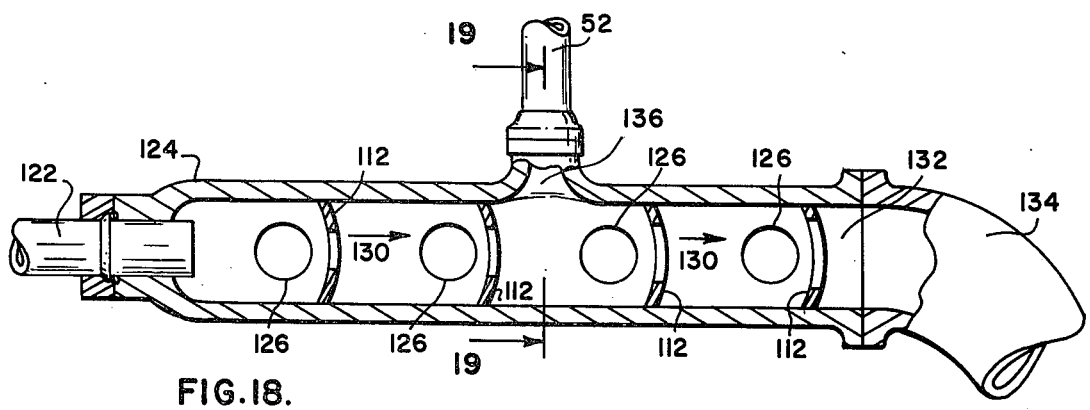
FIG. 18 is a fragmentary sectional view taken from the line 18-18 of FIG. 17.
Figure 19:
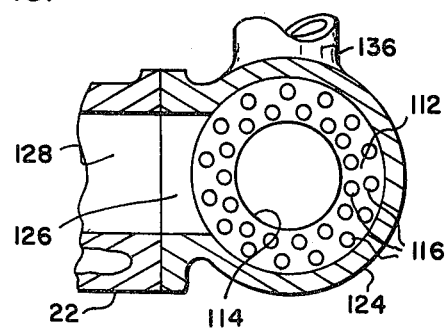
FIG. 19 is an enlarged fragmentary sectional view taken from the line 19—19 of FIG. 18.

With reference to FIG. 7 it will be understood that like reference characters in FIG. 1 are related to like referencee figures characters in FIG. 17 and the corresponding description.

In the modification as shown in FIG. 17, a conduit 120 communicates with the exhaust outlet openings 19 and this conduit 120 at its end 122 communicates with the interior of an exhaust manifold 124 which is a hollow manifold having openings 126 communicating with exhaust ports 128 which receive products of combustion from the exhaust valves 34 in the head ends of the cylinders 24.

The exhaust ports 128 exhausting into the openings 126 of the exhaust manifold 124 direct exhaust gases thereinto which fow toward atmosphere in the direction of arrows 130 and the exhaust manifold 124 is provided with an outlet opening 132 communicating with an exhaust pipe 134 which conducts the mixture of gases to atmosphere.

A medium portion of the exhaust manifold 124 is provided with an outlet port 136 which conducts exhaust gases into the conduit 52 communicating with the valve 54 hereinbefore described.

Mixing baskets 112 downstream of the ports 126 perform the function of hereintobefore described in relation to the baskets 112 shown in FIG. 15 of the drawings.

It will be seen that the modification as shown in FIG. 17 provides an alternate method for mixing the exhaust gases from the outlet openings 59 with the gases passing from the exhaust valve 34 so as to provide an after burning effect for the most inefficiently burned products of combustion and that the port 136 in the exhaust manifold 124 communicates with the conduit 52 for recycling some of the exhaust gases to the intake of the intake manifold 50 through the flow dividing valve 54 hereintobefore described.

Figure 20:
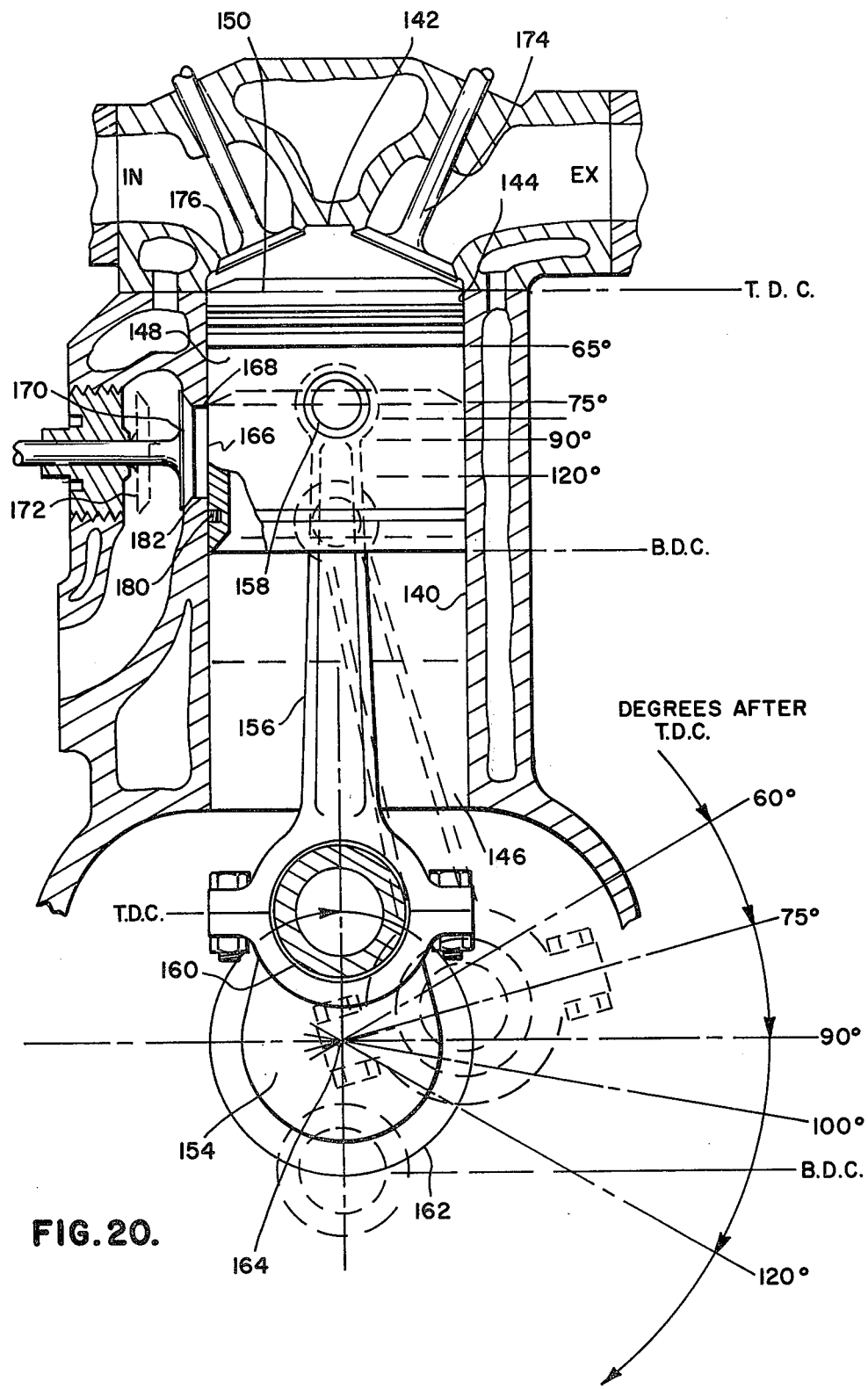
FIG. 20 is a scaled sectional view of an engine of the invention showing particularly details adapted to minimize the formation of nitrogen oxides in the products of combustion.
Figure 21:
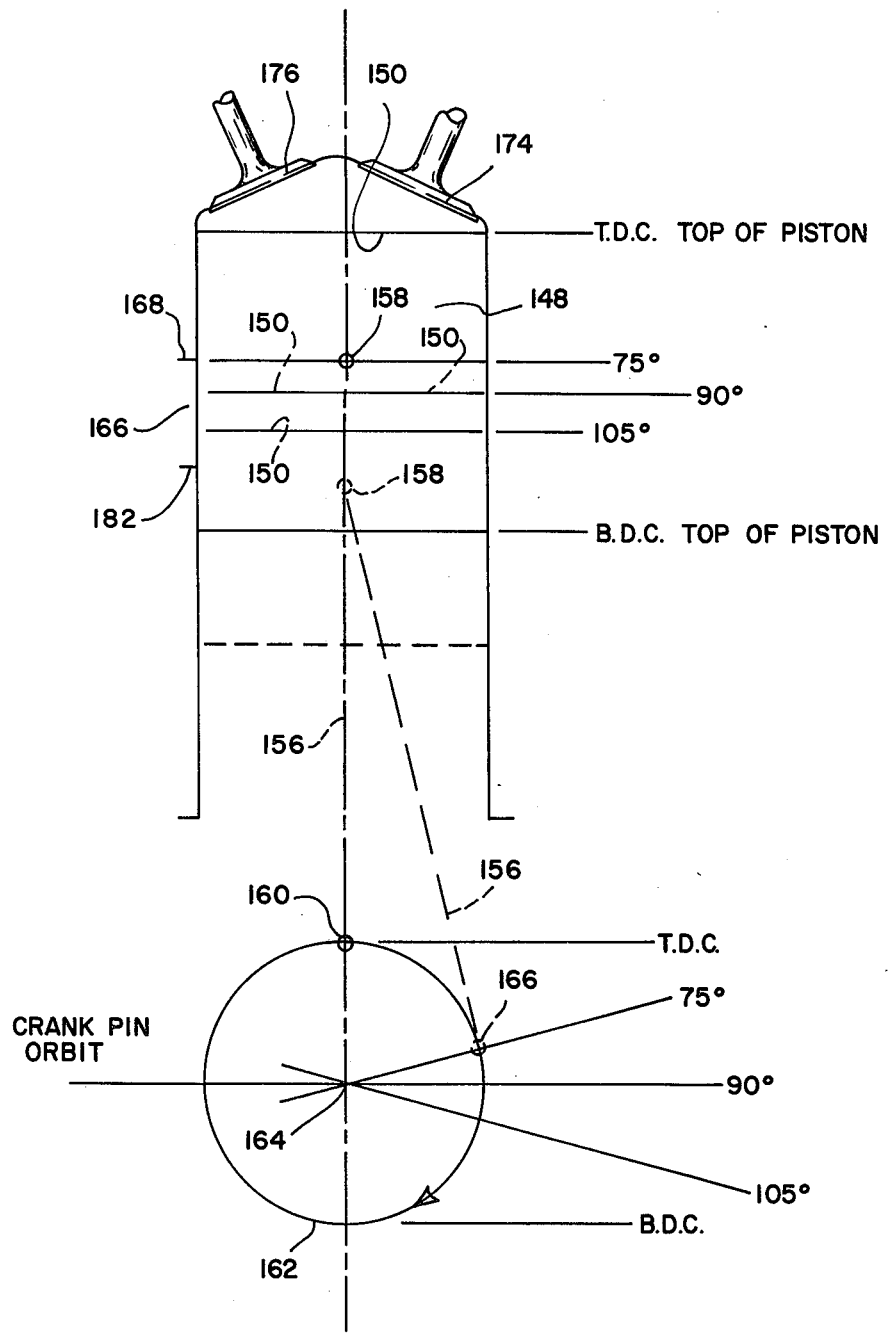
FIG. 21 is a diagramatic view directly related to FIG. 20 but showing the various degrees of crank shaft rotation and corresponding positions of the top portions of the engine piston from its top dead center position all of which relates to the exhaust edge of an exhaust outlet opening in the side wall of a cylinder.

As shown in FIG. 20 and also in the diagrammatic view FIG. 21 the engine of the invention comprises novel means for minimizing the formation of nitrogen oxides during the combustion cycle of the engine.

The disclosure of FIG. 20 includes means very similar in proportion to other structures hereinbefore described as for examples, FIG. 4 and other related Figs.

With reference to FIG. 20, the engine is provided with a cylinder 140 and a cylinder head 142. The cylinder has a head end 144 and crank case end 146 which is open to the crank case of the engine, a piston 148 is provided with a top end 150 shown in top dead center position relative to the rotation of the crank shaft 154. The piston 148 is pivotally connected to connecting rod 156 by means of a wrist pin 158 and a lower end of the connecting rod 156 is connected to a crank pin 160 of the crank shaft 154.

The crank pin 160 passes in an orbit 162 about the axis 164 of the crank shaft 154, all as shown in FIG. 20 and diagramatically in FIG. 21.

The cylinder 140 is provided with an exhaust outlet opening 166 having an upper exhaust edge 168 which is adapted to be passed by the top edge 150 of the piston 148 and at that time an exhaust valve 170 is disposed in open position 172 as shown in FIG. 20. The valve 170 is preferably cam operated as hereinbefore described but may be spring loaded if desired.

The exhaust edge 168 of the outlet opening 166 may be spaced from the top dead center position of the top of the piston 150 in its position as shown in FIG. 20 such that the exhaust edge 168 is spaced from the top dead center position a distance equal to a range of 74 degrees to 105 degrees which corresponds with crank shaft rotation from the top dead center position. The exhaust edge 168 in this position is thus adapted to receive combustion products from the cylinder when the top 150 of the piston 148 reaches the exhaust edge 168 and according to the design parameters of the engine the top of the piston may reach this edge 168 when the crank shaft has rotatead 75° from the top dead center position of the piston 148.

It will be understood that in accordance with the disclosure of FIG. 21 other positions of 90° and 105° diagramtically shown in correspondence with crank shaft rotation and according to the present invention the preferred range according to various design paramenters of four-cycle internal combustion engines may be between 75 and 105 degrees so that in this range the top of the piston may pass the exhaust edge 168 of the exhaust outlet opening 166 and thereby relieve hot gases from the top 150 of the piston such gases as hereinbefore described being the most efficiently burned products of combustion and leaving the most inefficiently burned products of combustion as hereinbefore described in and around the quench areas of the cylinder and the cylinder head which are generally water cooled.

As the piston moves from its top dead center position during the power stroke and during the ignition of fuel it travels only a short distance during the 75° to 105° of crank shaft rotation from top dead center and consequently the amount of tme during which the hot gases are in the cylinder is minimized due to the fact that a major portion of the hot gases and the B.T.U.'s are exhausted through the outlet opening 166 and thus the duration of containment of such hot gases being a major portion of the combustion products is very short as compared to the usual duration of conventional engines which includes substantially over 300° of crank shaft rotation. Consequently, the time during which the gases may exchange heat to the cylinder walls and the cylinder head and valve areas is reduced and this reduction of heat exchange lowers the temperature of successive cycles so that conduction, convection and radiation from these combustion chamber surfaces does not substantially heat the fuel charge preliminary to ignition in such manner as to cause the formation of excessive nitrogen oxide in the combusted fuel. It will be appreciated that according to well-known facts the power stroke of the piston may reach its optimum power producing position at or before 90° of crank shaft rotation from a top dead center position and it is well-known that in conventional engines the exhaustion of all the gases through the conventional exhaust valve which corresponds to the exhaust valve 174 in FIGS. 2 and 21 causes heating of the combustion chamber end of the cylinder head and this heat is conductively, convectively and by means of radiation transferred to the combustion charge. The degree of such heating in the engine as shown in FIG. 20 and 21 and especially around the exhaust valve 174 is greatly minimized due to the fact that the exhaust valve 174 does not have to pass all of the hot gases which are initially relieved through the outlet opening 166. Furthermore, when the piston is in its upper position and during the initiation of the power stroke by ignition of fuel any heat collected around the outlet opening 166 by heat transfer of the gases is remote from the fuel being combusted in the combustion chamber and consequently the heat conducted from the exhaust gases relieved through the outlet opening 166 does not contribute substantially to the preheating of the fuel in the combustion chamber before ignition of the spark plug. The intake valve 176 as shown in FIGS. 20 and 21 is substantially conventional as is the exhaust valve 174 and generally the area of the intake valve 166 is cool as compared to the area of the exhaust valve 174. In the present engine the area of the exhaust valve 174 is much cooler than the exhaust valve of the conventional engine which exhausts all of the exhaust products through such a valve. Accordingly, the exhaustion of a high percentage of the hot gases through the outlet opening 166 results from the gases being at fairly high pressure when the top 150 of the piston 148 reaches the exhaust edge 158 of the outlet opening 166. With this substantially high pressure the hot gases at the top of the piston are at substantially high temperature and relatively fluid as compared to the gases in the quench areas of the cylinder walls and cylinder head which are water cooled. Consequently, the gases stratified quite readily due to the fact that the higher temperature gases move more rapidly due to the substantial fluidity and thus a major portion of the B.T.U.'s of the exhaust product may be exhausted through the exhaust outlet opening 166 as the piston passes the exhaust edge 168. Due to the short period of time that the gases are in the chamber and due to the relief of the great percentage of B.T.U.'s it will be appreciated that the engine does not have much time to soak up heat from the gases of combustion as compared to the situation found in the usual four-cycle internal combustion engine. Consequently, successive cycles of the engine result in the operation of the combustion chamber at a relatively low temperature so that when new fuel charges are induced therein, the fuel charges are not heated to a degree which is equal to that in conventional engines. Consequently, the convection, conduction and radiation of heat to the fuel charge before ignition is minimized and the propagation of temperature is therefore minimized by a high ratio resulting in a substantial alleviation of temperature in the combustion chamber so as to prevent the combustion temperatures from rising to a degree critical to the production of nitrogen oxides in the products of combustion.

It will be appreciated that the performance of the present engine is improved by exhausting products of combustion from the exhaust outlet 166 due to the fact that the optimum power delivery to the crank shaft has already been attained in a range between 75° and 105° of crank shaft rotation and then the fact that the gases exhausted from the outlet opening 166 are not a burden to the engine when the piston moves upward on its exhaust stroke to force the remaining products of combustion out of the valve 174. Additionally, power is saved due to the fact that friction of the piston on the cylinder wall is minimized because the force of exhausting the gases through the exhaust valve 174 is minimized since the charge being exhausted therethrough has been reduced by the amount which has been previously exhausted through the outlet opening 166.

In the mechanical construction of the engine it will be noted that the piston 148 is provided with an oil control ring 180 which is disposed below the lower edge 182 of the outlet opening 166 when the piston 148 is in its top dead center position as shown in FIG. 20. Consequently, the transfer of oil and exhaustion thereof through the outlet opening 166 is prevented by the oil control or scrapen ring 180 wich never passes the outlet opening 166 thus hydrocarbon emissions are prevented due to any loss of oil through the outlet opening 166 as the hot gases exhaust therethrough.

The lower edge 182 of the exhaust outlet opening is spaced from the upper edge 168 a sufficient distance to constitute the diameter of a suitable exhaust valve or in some instances the spacing of the lower edge 182 relative to the upper edge 168 may be closer if it is desired to change the shape of the exhaust outlet opening 166 to a different configuration.

The present arrangement provides for a desirable and proportional relationship between cylinder bore diameter, piston stroke and strength, and valve diameter using conventional circular poppet valves. It will be appreciated that the exhaust timing relative to the exhaust outlet opening 166 and relative to the intake and exhaust valves 176 and 174 are important to the functioning of the present engine to avoid the formation of nitrogen oxides. By way of example only, the present engine, cam shaft as hereinbefore described is disposed to open the exhaust valvee 174 at substantially 4° before bottom dead center which is shown relative to the crank shaft in FIG. 21 by the initials B.D.C. thus the present engine is adapted such that the exhaust valve 174 opens cosiderably after the piston passes the outlet opening edge 168 and after gas has been exhausted through the exhaust outulet opening 166 thus exhaust through the valve 174 is later than conventional engines and this exhaust valve 174 in accordance with the operation of the cam hereinbefore described closes approximately 28° after the piston reaches top dead center on the exhaust stroke, this top dead center position being designated T.D.C. in the diagramatic view of FIG. 1 on the crank pin orbit disclosure and the duration of the open position of the exhaust valve 174 thus totals only 212° which is considerably less than that of conventional four-cycle internal combustion engines.

Also by way of example only the intake valve 176 may be operated by the cam of the engine hereinbefore described such that the intake opens approximately 8° before top dead center and closes substantially 60° after bottom dead center for a duration of approximately 248° or any other suitable combination of degrees may be used. The foregoing disclosure of the timing of the piston passing the exhaust edge 168 and of the intake and exhaust valves 176 and 174 respectively is important to the operation of the engine for minimizing nitrogen oxide emissions and the hereinbefore described relationship of the top of the piston to the upper edge 168 of the outlet opening 166 is most critical to the alleviation of nitrogen oxide emissions due to the hereinbefore described relief of heat from the combustion chamber to thereby minimize heat exchange thereto and to minimize the temperature during continuous cycling of the engine in the combustion chamber area so as to prevent undue heating of a fuel charge before it is ignited by the spark plug all of which results in a reduction in the propagation of temperature in the fuel charge during its combustion and which maintains the overall or upper temperature of a major portion of the charge below the critical temperature range which is believed to be around 2750°F. As hereinbefore described the function of the engine is enhanced as to its power producing capabilities due to the fact that the optimum power may be obtained in a range between the aforementioned 75° and 105° positions and that the exhaustion of exhaust gases is minimized due to the relief of most of the hot gases from the outlet opening 166 thereby alleviating the necessity of having to compress these gases in the cylinder and to exhaust them through the exhaust valve 174.

Even though the aforementioned range is preferably between 75° and 105°, it will be understood the nitrogen oxide formation may be substantially avoided when the 60° position or the 120° position is used. However, loss of power may be attendant to the 60 degree position and relatively greater nitrogen oxide formation may be attendant to the 120° position. It will be understood that the range aforementioned, namely, 75° to 105° or 60° to 120° may be termed an intermediate power stroke position wherin a major or optimum power delivery is obtained before gas is exhausted through the exhaust outlet opening 166.

It will be obvious to those skilled in the art that various modifications of the invention may be resorted to without departing from the spirit thereof.

I claim:

1. In a four cycle internal combustion engine, the combination of: a cylinder having a head end; a cylinder head at said head end; said cylinder having a crankcase end; a piston having a top portion facing said head end; said piston reciprocally mounted in said cylinder; a connecting rod pivotally coupled to said piston; a crankshaft pivotally carrying said connecting rod; a fuel inlet valve communicating with said head end of said cylinders; an exhaust outlet valve disposed in communication with said head end of said cylinder; said cylinder having an exhaust outlet opening in the side wall thereof; said exhaust outlet opening communicating with atmosphere and having an area spaced from said head end of said cylinder a distance equal to a major power portion of the stroke of said piston in said cylinder; said outlet opening having an exhaust edge spaced from a top dead center position of the top of said piston; said distance corresponding to a range between 60° and 110° of crankshaft rotation from said top dead center position of said top of said piston; whereby, on the power stroke of said piston, said top thereof passes said exhaust edge of said outlet opening at a time when combustion gasses in said cylinder are at a pressure high enough to rapidly expell a hot stratum of gas from the top of said piston and outwardly through said outlet opening, and whereby said hot gas stratum adjacent said piston is relatively light and fluid as compared to the remaining gasses around the relative cool quench area of the cylinder and said head, thus said hot gas stratum moves rapidly away from said remaining gasses and said hot gas stratum carries a substantial amount of B.T.U.'s from said cylinder after remaining there for only a very short time during approximately 60° to 110° of crankshaft rotation; thus minimizing heat exchange from said gas to said cylinder and said head; and whereby heat, critical to the formation of nitrogen oxide, is released from said cylinder well before the following exhaust stroke of said piston and the subsequent power stroke thereof; and whereby said exhaust outlet valve is relieved of all the hot gases which previously pass through said outlet opening; thereby minimizing heating of said head and said head end of said cylinder and said exhaust valve and to thereby alleviate the formation of nitrogen oxides during the combustion of fuel in said cylinder and during the power stroke of said piston and whereby any heat collected in the area of said exhaust outlet opening is substantially remote from the gasses being combusted in said cylinder during said power stroke to further minimize formation of nitrogen oxides and whereby, during the exhaust stroke of said piston, the relatively small amount of said remaining gas requires a minimum of compression force to expell said remaining gas through said exhaust valve thereby saving power and reducing piston friction and resultant heating of said cylinder all of which contributes to continuous relatively cool operation in the combustion area of the cylinder and its head and during successive combustion cycles therein so as to minimize the overall formation of nitrogen oxides.

2. The invention as defined in claim 1, wherein: an auxillary exhaust valve is disposed to close and open said outlet opening.

3. The invention as defined in claim 2, wherein: cam means is disposed for operating said auxillary exhaust valve.

4. The invention as defined in claim 3, wherein: said cam means is disposed to open said auxillary exhaust valve prior to the approach of said top of said piston to said exhaust edge of said outlet opening whereby hot gas scrubbing and heat exchange around said auxillary valve is minimized.

5. The invention as defined in claim 1, wherein: cam means is provided for opening said first mentioned exhaust valve after said top of said piston has passed said exhaust edge of said exhaust outlet opening and after gas has been exhausted therethrough.

6. The invention as defined in claim 5, wherein: means is provided for opening said inlet valve before said piston reaches said top dead center position and for closing said inlet valve after a relative bottom dead center position of said piston.

7. A method for operating a four-cycle crankshaft operated internal combustion engine comprising: sequentially moving a piston in a cylinder of said engine; introducing a fuel mixture into the head end of said cylinder of said engine through an intake means; firing said fuel mixture adjacent the top surface of said piston in said cylinder and driving said piston away from said head end of said cylinder to a position in which the top surface of the piston is in a range corresponding with 60° to 110° of crankshaft rotation from a top dead center position of said piston; then exhausting a stratum of hot gas from said top surface of said piston and through an exhaust opening in the side wall of said cylinder; whereby on the power stroke of said piston top thereof passes an exhaust edge of said outlet opening within a range of 60° to 110° of crankshaft rotation at a time when the pressure of combustion gasses in said cylinder is high enough to rapidly expell a hot stratum of gas from the top of said piston and outwardly through said outlet opening and whereby said hot gas stratum adjacent said piston is relatively light and fluid as compared to the remaining gases around the quench areas of the cylinder and its head end thus causing said hot gasses under substantial pressure to move rapidly away from said remaining gasses and causing said hot gasses to carry a substantial amount of B.T.U.'s from said cylinder after remaining there for only a very short time during approximately 60° to 110° of crankshaft rotation thus minimizing the heat exchange therefrom to said cylinder and said head end whereby heat, critical to the formation of nitrogen oxides, is relieved from said cylinder well before the following exhaust stroke of said piston and subsequent power stroke and whereby the relief of heat through said outlet opening greatly reduces the remaining hot gases in said cylinder whereby, on the exhaust stroke, the reduced charge of hot gasses is forced out through an exhaust valve in the head end of said cylinder resulting in minimum heating of said exhaust valve and the head end of said cylinder as well as the cylinder head and thus alleviating the formation of nitrogen oxides during the combustion of fuel in said cylinder and during the power stroke of said piston and whereby heat collected in the area of said exhaust outlet opening is substantially remote from the gasses being combusted in said cylinder by causing combustion to occur when said piston is above said outlet opening at its top portion to further minimize the formation of nitrogen oxide and whereby during the exhaust stroke of said piston the relatively small amount of said remaining gas requires a minimum of compression force to expell the same through said exhaust valve thereby saving powere and reducing piston friction and resultant heating of said cylinder all of which contributes to continuous cool operation of the combustion area of the cylinder and its head during successive combustion cycles therein and thus minimizing the overall formation of nitrogen oxides by holding the maximum temperature of the combustion chamber of the engine down to a level at which a minimum of nitrogen oxides form.

8. A method for operating a four-cycle crank shaft operated internal combustion engine comprising: sequentially moving a piston in a cylinder of said engine; introducing a fuel mixture into the head end of said cylinder of said engine through an intake means; firing said fuel mixture adjacent the top surface of said piston in said cylinder and driving said piston away from said head end of said cylinder to a position in which the top surface of the piston is in an intermediate power stroke position wherein a major power delivery is obtained relative to crank shaft rotation from a top dead center position of said piston; then exhausting a tratum of hot gas from said top surface of said piston and through an exhaust outlet opening in the side wall of said cylinder to atmosphere such that on the power stroke of said piston, said top thereof passes an exhaust edge of said outlet opening within said intermediate power stroke position relative to crank shaft rotation in a range between 60° and 110° from top dead center and at a time when combustion gases in said cylinder are high enough to rapidly expel a hot stratum of gas from the top of said piston and outwardly through said outlet opening and whereby said hot gas stratum adjacent said piston is relatively light and fluid as compared to the remaining gases around the quench areas of the cylinder and its head end thus causing said hot gases to move rapidly away from said remaining gases and causing said hot gases to carry a substantial amount of B.T.U.'s from said cylinder after remaining there for only a very short time until said top of said piston reaches said intermediate position thus minimizing the heat exchange therefrom to said cylinder and said head end whereby heat, critical to the formation of nitrogen oxides, is relieved from said cylinder wall before the following exhaust stroke of said piston and subsequent power stroke and whereby the relief of heat through said outlet opening greatly reduces the remaining hot gases in said cylinder whereby on the exhaust stroke the reduced charge of hot gases is forced out through an exhaust valve in the head end of said cylinder resulting in minimum heating of said exhaust valve and the head end of said cylinder as well as the cylinder head and thus alleviating the formation of nitrogen oxides during the combustion of fuel in said cylinder and during the power stroke of said piston and during the exhaustion of gas around said exhaust valve and whereby heat collected in the area of said exhaust outlet opening is substantially remote from the gases being combusted in said cylinder by causing combustion to occur when said piston is above said outlet opening at its top portion to further minimize the formation of nitrogen oxide and whereby during the exhaust stroke of said piston the relatively small amount of said remaining gas requires a minimum compression force to expel the same through said exhaust valve thereby saving power and reducing piston friction and resultant heating of said cylinder all of which contributes to continuous cool operation in the combustion area of the cylinder and its head during successive combustion and exhaust cycles and thus minimizing the overall formation of nitrogen oxides by holding the maximum temperature of the combustion chamber and exhaust valve therein down to a level at which nitrogen oxides do not readily form.

9. The invention as defined in claim 8, wherein; and opening said exhaust valve after said piston has passed to said intermediate power stroke position and after gas has been exhausted through said exhaust outlet openings.

10. The invention as defined in claim 1 wherein; a recycling conduit means communicates between and with said exhaust outlet valve and said fuel inlet valve; an exhaust manifold through which said outlet opening communicates with atmosphere; a second exhaust conduit communicating with said recycling conduit; said second exhaust conduit also communicating with the interior of said exhaust manifold.

11. The invention as defined in claim 2 wherein; said auxiliary exhaust valve is provided with a spring adapted normally to hold said exhaust outlet opening closed and adapted to be opened by exhaust pressure in said cylinder.

12. The invention as defined in claim 7 wherein; and exhausting into an exhaust manifold, from said outlet opening in the side wall of said cylinder, the most efficiently burned products of combustion from the surfaces of said pistons which comprise said hot stratum of gas; leaving the most inefficiently burned products of combustion in the head ends of said cylinders; then moving said pistons towards said head ends of said cylinder and exhausting some of the most inefficiently burned products of combustion into said intake means of said engine and mixing a fresh fuel mixture with said inefficiently burned products to produce a recycling mixture; then introducing said recycling fuel mixture into the head ends of said cylinders and firing said recycling fuel mixture therein; and conducting some of the most inefficiently burned products of combustion into said exhaust manifold and mixing with the efficiently burned products of combustion from the surfaces of said pistons, whereby the inefficiently burned products are afterburned to thereby burn and reduce the hydrocarbons emissions; and then exhausting the mixture of said gasses to atmosphere.

13. The invention as defined in claim 7 wherein; the exhaust gasses exhausted through said exhaust valve are conducted into communication with the hot gasses exhausted from said outlet opening to thereby afterburn the gasses exhausted through said exhaust valve and to thereby minimize hydrocarbons emissions to atmosphere.

* * * * *